(12) United States Patent
Svendsen

(10) Patent No.: US 8,376,701 B2
(45) Date of Patent: Feb. 19, 2013

(54) MULTI-STAGE CENTRIFUGAL PUMP ASSEMBLY (SHAFT)

(75) Inventor: Karl-Henrik Svendsen, Randers SO (DK)

(73) Assignee: Grundfos Management a/s, Bjerringbro (DK)

( * ) Notice: Subject to any disclaimer, the term of this patent is extended or adjusted under 35 U.S.C. 154(b) by 535 days.

(21) Appl. No.: 12/720,792

(22) Filed: Mar. 10, 2010

(65) Prior Publication Data

US 2010/0232950 A1    Sep. 16, 2010

(30) Foreign Application Priority Data

Mar. 10, 2009    (EP) ..................................... 09003441

(51) Int. Cl.
*F04D 17/12*    (2006.01)
*F04D 29/044*    (2006.01)
(52) U.S. Cl. .................................. 415/216.1; 415/199.1
(58) Field of Classification Search ............... 415/216.1, 415/199.1; 416/204 R, 244 R; 417/423.6; 403/361; 464/182
See application file for complete search history.

(56) References Cited

U.S. PATENT DOCUMENTS

| | | | | |
|---|---|---|---|---|
| 4,986,733 A | * | 1/1991 | Fleury et al. | 415/230 |
| 5,378,124 A | * | 1/1995 | Welch | 417/423.1 |

FOREIGN PATENT DOCUMENTS

| | | |
|---|---|---|
| DE | 4223544 A1 | 1/1994 |
| DE | 29606135 U1 | 10/1996 |
| DE | 10323169 A1 | 12/2004 |
| DE | 102006021446 A1 | 11/2007 |
| FR | 2288888 A2 | 5/1976 |

* cited by examiner

*Primary Examiner* — Ninh H Nguyen
*Assistant Examiner* — Liam McDowell
(74) *Attorney, Agent, or Firm* — Panitch Schwarze Belisario & Nadel LLP

(57) ABSTRACT

With the multi-stage centrifugal pump assembly, the connection between the motor shaft (7) and the pump shaft (9) is effected by way of a thread (26, 27), which joins the fits (31, 34) lying therebehind, between a pocket hole bore (24) in the pump-side end of the motor shaft (7) and the motor-side end of the pump shaft (9). Thereby, a transition fit (32) is provided in the region of the bearing (11), and a press fit 34 in the free region therebehind.

14 Claims, 4 Drawing Sheets

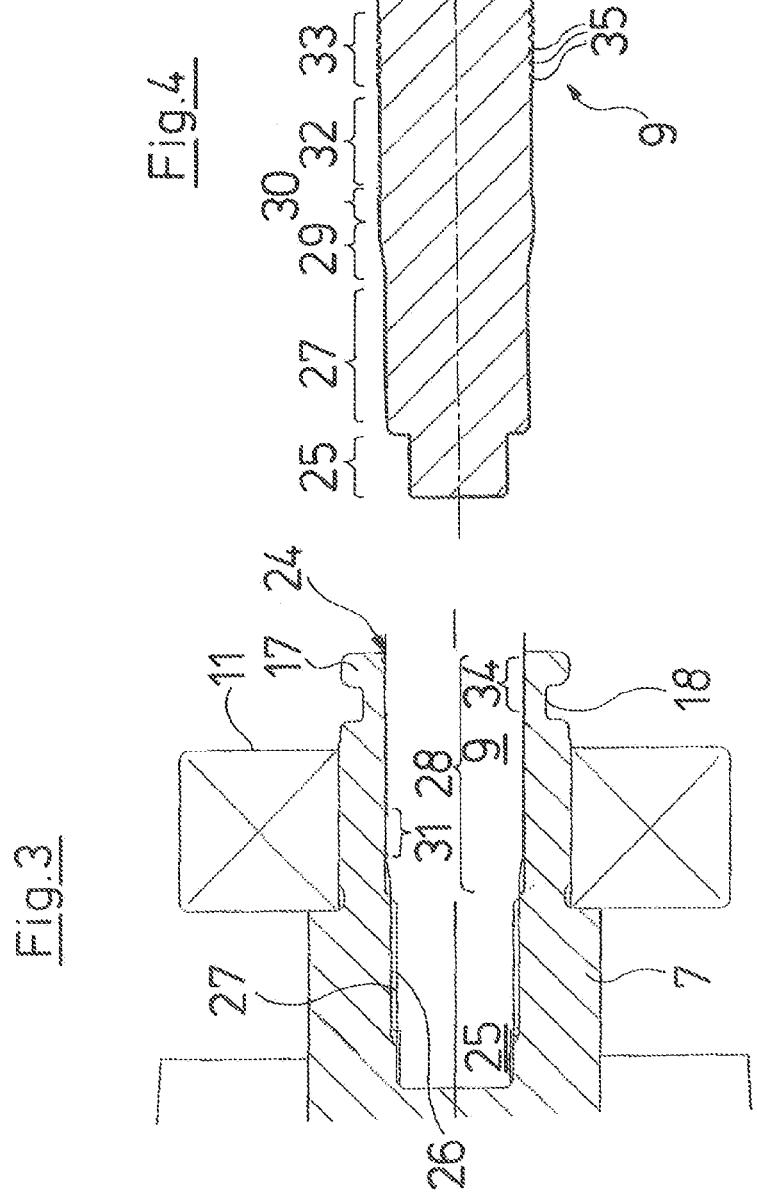

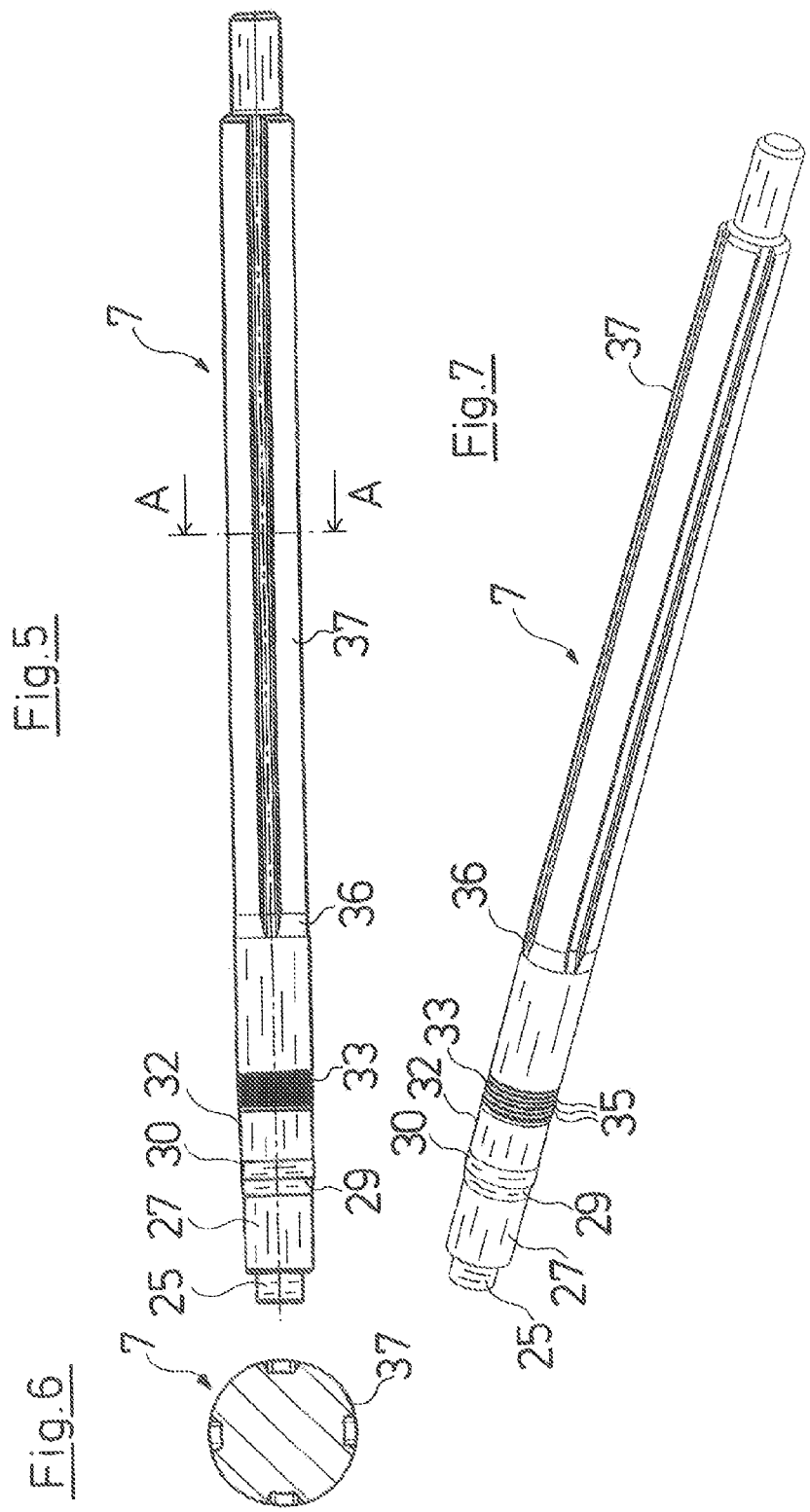

MULTI-STAGE CENTRIFUGAL PUMP ASSEMBLY (SHAFT)

BACKGROUND OF THE INVENTION

The invention relates to a multi-stage centrifugal pump assembly having a motor housing with a motor shaft which is rotatably mounted and which carries a rotor, and having a pump housing with a rotatably mounted pump shaft, on which impellers are arranged in a rotationally fixed manner, wherein the pump housing is fixedly connected to the motor housing, and the motor shaft is fixedly connected to the pump shaft, and the motor-side end of the pump shaft is fixed within a pocket hole at the pump-side end of the motor shaft, and having a bearing for the shaft mounting, which is arranged in a bearing carrier provided in the connection region of the housing.

Multi-stage centrifugal pump assemblies of this type, in their most varied of designs, are counted as belonging to the state of the art. In this context, the assemblies manufactured and marketed by the company Grundfos under the type description CH and respectively CHN, for example the assembly of the type CHN2-50 with a drive motor MG71 are referred to only by way of example. With regard to these multi-stage centrifugal pumps, it is in particular the case of those whose shaft is arranged in a lying manner, which means to say horizontally with the usual alignment.

The pump assemblies of the above mentioned construction series have proven their worth in practice. They comprise a motor housing with a motor shaft rotatably mounted therein, which carries a rotor, as well as a pump housing with a rotatably mounted pump shaft, on which several impellers are arranged in a rotationally fixed manner. The motor housing is firmly connected to the pump housing and typically comprises a common component, the bearing carrier, which radially supports the pump-side end of the motor shaft, and the motor-side end of the motor shaft, which is incorporated in this region. Thereby, the motor-side end of the pump shaft is fixed within a pocket hole on the pump-side end of the motor shaft, and specifically by way of a press fit, which is usually effected by way of thermal joining, which means by way of joining after heating the motor shaft and cooling the pump shaft and/or by way of mustering suitably high forces in the axis direction of the shafts. This basically does not represent a problem, but has the disadvantage that the shaft connection must typically be effected before the finishing assembly of the motor, since the separate heating of the motor shaft is otherwise not possible. Moreover, the motor is usually not designed for mustering such high axial forces, as are required for the joining of a press fit. Thus, on motor manufacture, one must already ascertain which pump, that is to say which shaft, is applied for which number of impellers. Moreover, the axial construction length of this known design in the region of the bearing/shaft connection is comparatively large, since the press fit is arranged outside the bearing region, in order not to negatively influence this.

BRIEF SUMMARY OF THE INVENTION

Against this background, it is the object of the invention to design a multi-stage centrifugal pump assembly according to the type described at the outset, such that the connection between the motor shaft and the pump shaft may be effected after the assembly of the motor, and which furthermore permits a design which is constructed in a compact manner in the axial direction.

According to the invention, this object is achieved by a centrifugal pump assembly wherein the pump shaft comprises an outer thread on or near to its motor-side end, the outer thread meshing into an inner thread of the pocket hole, and wherein spaced from this outer thread in the direction of the impeller, a first fit as well as, spaced from this, a second fit are provided between the pump shaft and the pocket hole.

With the centrifugal pump assembly according to the invention, the pump shaft is provided with an outer thread on or near to its motor-side end, and this outer thread meshes into an inner thread of the pocket hole on the pump-side end of the motor shaft. A first fit is provided at a distance to this in the direction of the impeller as well as a second fit distanced to this, between the pump shaft and the pocket hole. A joining of the fits is also possible after the assembly of the motor by way of the thread connection between the two shafts, since on attaching suitable positive fit means onto the shafts to be connected, the axial forces are applied exclusively by way of the joining of the thread sections between the pump shaft and the motor shaft, thus no axial loading whatsoever of the motor is effected. Moreover, due to the division of the fit into two part fits which are distanced to one another, one may also ensure that any material widening of the motor shaft may be placed into regions outside the bearing. Moreover, the stress distributions within the shafts due to the two fits which are distanced to one another, are significantly more favorable than with a single fit, which must have a greater length. Finally, at least one fit may be placed into the region of the bearing due to this division, by which means the axial construction length may be reduced.

It is therefore the basic concept of the present invention to design the shaft connection such that the comparatively high joining forces in the axial direction on joining the press fit, which would unallowably load the motor after the effected assembly, are mustered by inner forces, specifically by way of the tensile forces which arise on joining the thread and which arise by way of suitable application of a torque between the shafts. A further essential concept is the otherwise usual one of replacing a press fit by two fits which are distanced to one another, which may then naturally be designed axially shorter and arranged at a suitable location, without providing separate shaft sections for this, which are otherwise without any design function.

It is particularly advantageous, if, according to a further embodiment of the invention, the first fit is a transition fit. First fit in the context of the present invention is the one which is closest to the motor. The second fit is then advantageously a press fit, in order to be able to transmit the required forces. This graduation into a transition fit and press fit is particularly advantageous, since the stresses which arise within the pocket hole of the motor shaft due to the fits may be applied in a graduated manner, such that they are greatest at the end of the motor shaft and not in a middle region, in particular, bearing region.

Usefully, a guide peg which is seated with play in a recess suitably formed on the base of the pocket hole, is provided at the motor-side end of the pump shaft. Such a guide peg ensures a secure guiding on joining the shafts, and prevents a damage of the thread when the shafts are inserted into one another, before the screwing is effected.

It is further advantageous for the joining procedure, for the pump shaft to be designed in a conically widening manner from its motor-side outer thread towards the section which forms part of the first fit. An automatic centering during the joining procedure is effected by way of this, so that the forces may be uniformly distributed over the whole periphery.

It is particularly advantageous if the pump shaft in the region between the sections for the first and the second fit has a smaller diameter than in the fit sections. This also favorably helps with the joining procedure, in particular when both fits have roughly the same nominal diameter.

According to a further embodiment of the invention, one envisages providing the second fit with peripheral lubrication grooves, which simplify the joining procedure, in particular in the region of the press fit, in order to keep the joining forces, in particular for the second fit which is advantageously designed as a press fit, within defined limits. The lubrication grooves are filled with a suitable lubrication agent before the joining, and in particular prevent the danger of cold welding, as occasionally occurs on joining under high forces, particularly with stainless steels.

The first fit, which is preferably a transition fit, according to a further embodiment of the invention, is usefully arranged where the motor shaft is surrounded by the bearing, and specifically preferably centrally to the bearing, thus where the roller bearings are supported, if such a roller bearing is applied, which is usual in this region.

The second fit, with which it is preferably the case of the press fit, is advantageously arranged on the other side of the bearing, and specifically towards the pump side close to the end of the motor shaft. This arrangement has the advantage that no effects on the bearing are to be feared on account of the press fit, and on the other hand the connection is arranged as much as possible on the pump side, which is particularly favorable with regard to the mounting of the motor shaft, as well as with regard to the resulting momentary loads of the pump shaft with respect to the mounting and the fit connection itself.

According to a further embodiment of the invention, a slinger ring is arranged on the pump shaft in front of the pump-side end of the motor shaft, and tightly encompasses the pump shaft and is arranged within a free space of the bearing carrier, which is conductively connected to the surroundings via a channel connecting at the bottom. This reliably prevents any delivery fluid, which exits from the pump housing along the pump shaft via the axial face seal, from getting into the motor via the motor shaft. In the installation position, within the context of the invention, thus means where the fluid flows away naturally on account of gravitational forces. Any fluid running along the shaft is led onto the slinger ring by way of such a slinger ring, which on rotation of the shaft, due to centrifugal forces, leads the fluid to the outside, where it is led away via the free space and the channel on account of gravitational forces.

According to a further embodiment of the invention, the slinger ring has an h-shaped cross section and is lockingly held with a positive fit by way of a bead formed at the pump-side end of the motor shaft. Such a bead may be formed in a simple manner by way of nicking a groove in the end region of the motor shaft. The elastic slinger ring is pushed over the bead, and then locks within the groove, by way of which it is then fixed in the axial direction, whereas its sealing bearing with the other limb is effected at the pump shaft. For this, the slinger ring is to be designed of an elastic material, advantageously of plastic. The arrangement with respect to the pump shaft is such that this is biased, so that a sealing bearing on the pump shaft is also ensured over a longer time period.

According to a further embodiment of the invention, a stationary sealing ring is provided in the bearing carrier between the bearing and the slinger ring, and is radially sealed with respect to the bearing carrier by way of an O-ring and runs in a biased and sealing manner on the axial side of the inner bearing ring of the roller bearing, which co-rotates with the shaft, and specifically on the side which faces the pump. All this ensures an increased safety against fluid penetrating into the motor. Since the bearing ring of a roller bearing is typically designed in a manner such that its surface is treated, this service lends itself for forming an additional sealing surface, since no separate further machining is required on the part of the manufacturer. This stationary sealing ring is also advantageously arranged within a free space, which is conductively connected to the surroundings, usefully via the same channel via which the slinger ring is also connected the surroundings, thus the surroundings surrounding the pump assembly. This serves to lead away fluid getting into the aforesaid region.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is a greatly simplified, schematic sectioned representation of a bearing, a pump-side end of the motor shaft, and a motor-side end of the pump shaft, FIG. 4 is a longitudinal section of the motor-side part of the pump shaft, FIG. 5 is a lateral view of the pump shaft, FIG. 6 is a section along the section line A-A in FIG. 5, and FIG. 7 is a perspective representation of the pump shaft.

DETAILED DESCRIPTION OF THE INVENTION

Figure 1:
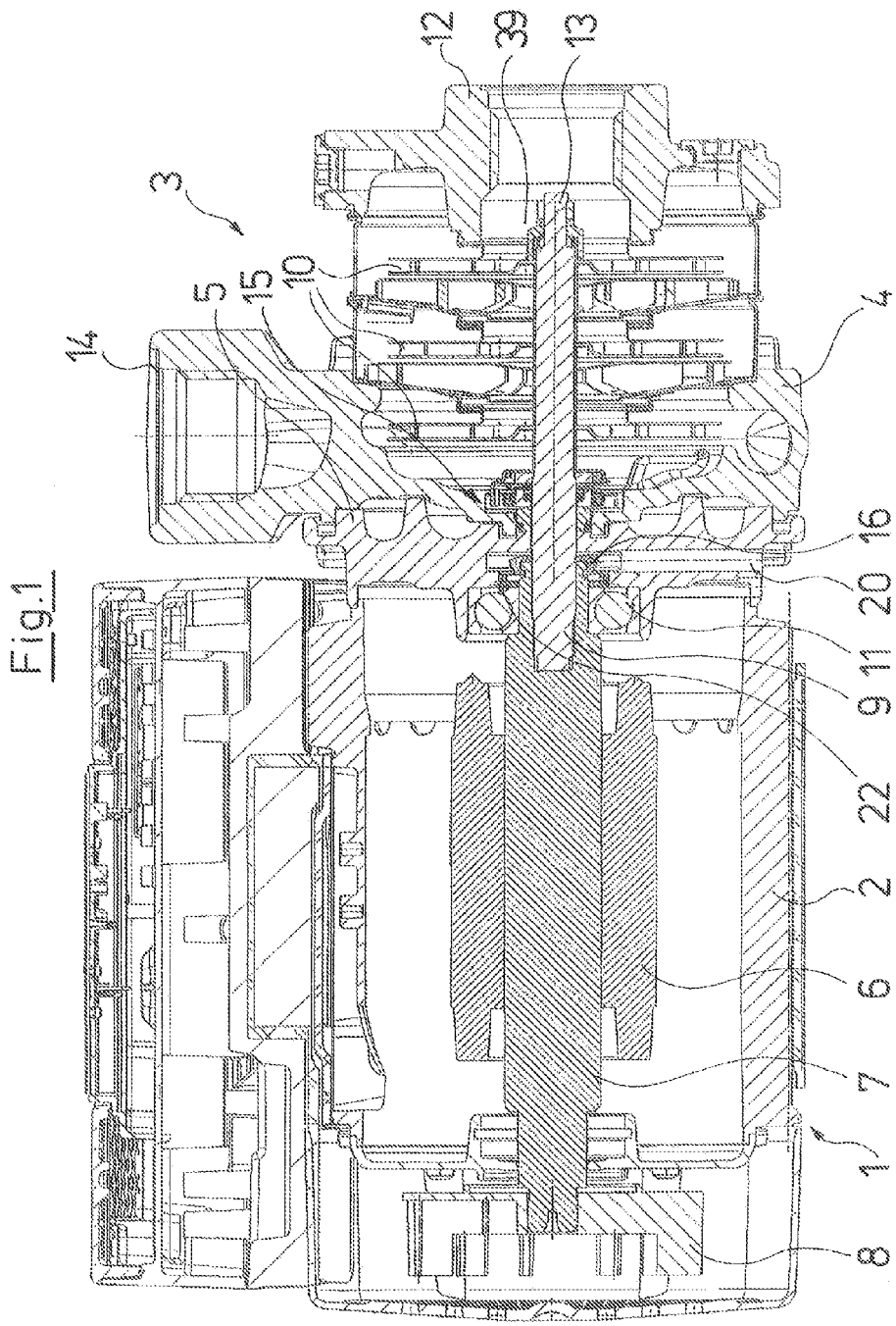
FIG. 1 is a greatly simplified, schematic representation in a longitudinal section through a three-stage pump assembly according to an embodiment of the invention.
Figure 2:
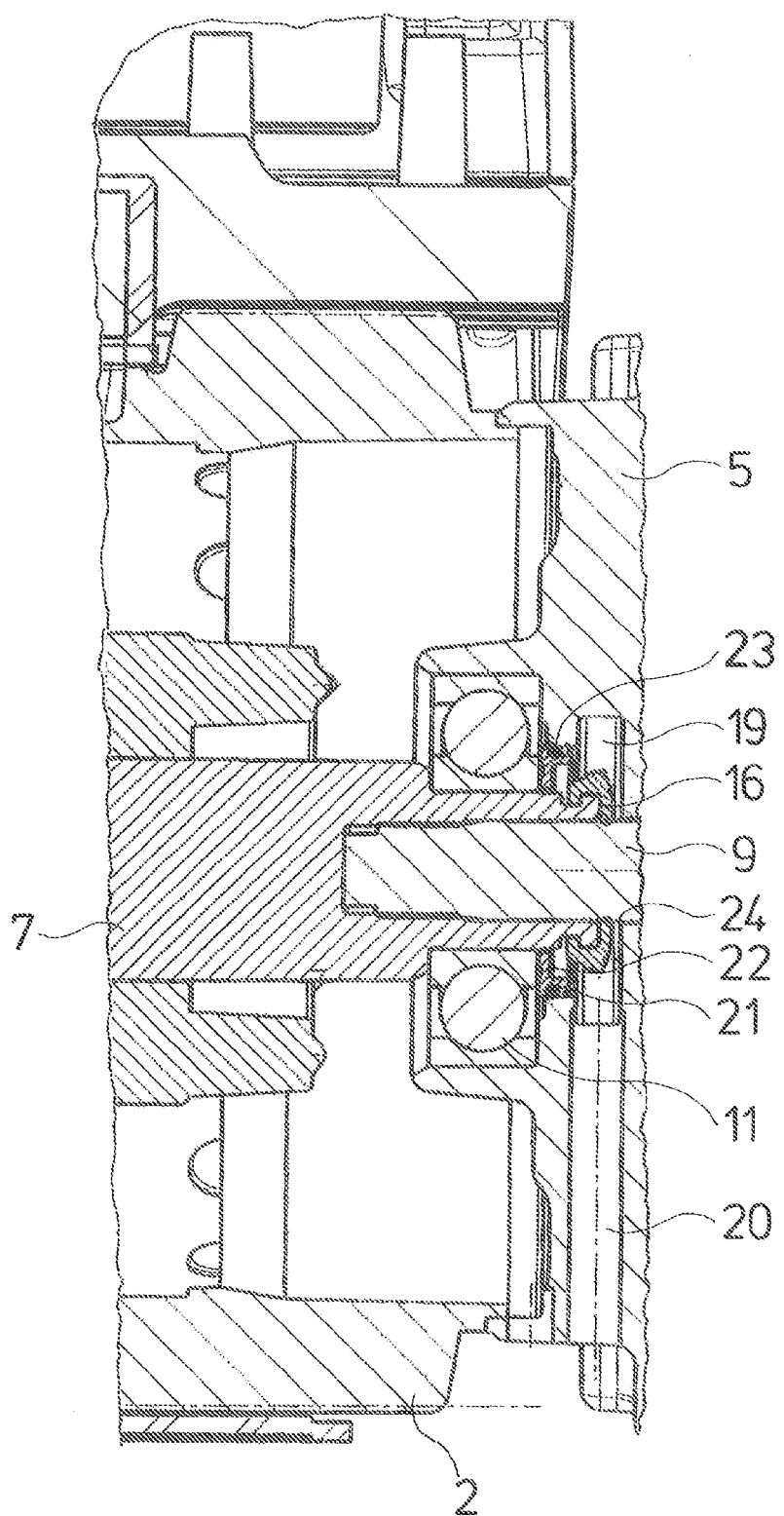
FIG. 2 is an enlarged sectional representation of the region of the bearing carrier of FIG. 1.

The pump assembly represented by way of the figures comprises a motor 1 with a motor housing 2, and a pump 3 with a pump housing 4. The motor housing 2 and the pump housing 4 are connected to one another via a bearing carrier 5. The bearing carrier 5 may form part of the motor housing 2 or part of the pump housing 4 or part of both, depending on the design.

A motor shaft 7 carrying a rotor 6 is arranged within the motor housing 2, and a fan wheel 8 is fastened on one end of this shaft, and a pump shaft 9 connects to the other end, said pump shaft being mounted within the pump housing 4 and carrying three impellers 10 in the shown embodiment. The motor shaft 7 on the pump side, thus where the pump shaft 9 is connected to the motor shaft 7 in a rotationally fixed manner, is mounted by way of a roller bearing 11 in the form of a ball bearing, which is arranged in the bearing carrier 5.

A suction connection 12 of the pump is provided at the free end-side of the pump housing 4 and is arranged coaxially to the rotation axis 13 of the shafts 7 and 9. The pump 3 comprises a pressure connection 14 which departs radially upwards and is conductively connected to the exit of the third pump stage. An axial face seal 15 is provided at the motor-side end of the pump housing 4. Further sealing means are provided in the region of the bearing carrier 5.

Thus a slinger ring 16 which is h-shaped in cross section is sealingly attached on the motor-side end of the pump shaft 9.

The slinger ring 16 is formed of elastic plastic material and encompasses an end-side bead 17, which is formed by a groove 18 close to the pump-side end in the motor shaft 7. The slinger ring 16 is pushed over the bead 17 and is thus arranged in a locking manner with a positive fit with the short limb of its cross section in the groove 18. The long limb with its inner side bears sealingly on the pump shaft 9. The inner region is biased in the region of the long limb, thus where it is directed to the pump, so that it bears on the pump shaft 9 in a sealing manner. It lies within a free space 19 of the bearing carrier 5, which is connected via a downwardly leading channel 20 to the outer surroundings. In operation, any fluid penetrating along the pump shaft 9 through the axial face seal 15 gets onto the slinger ring 16, which carries this and is flung into the free space 19 by way of centrifugal force, from where it is led away to the outside via the channel 20.

A further free space 21 of a smaller diameter, which is connected to the free space 19, is arranged behind the free space 19 in the direction to the motor 1, and is provided for receiving a stationary sealing ring 22, which is fixed within the radial peripheral surface of the free space 21 and is sealed with respect to the bearing carrier 5 by way of an O-ring 23. The stationary sealing ring 22 has a radially inwardly directed section, with which this bears on the axial side of the inner bearing ring of the ball bearing 11, said bearing ring co-rotating with the shaft 7, and thus this section forms a further barrier against fluid.

The pump shaft 9 as well as its connection to the motor shaft 7 is represented in detail by way of FIGS. 3 to 7. The motor shaft, for receiving the motor-side end of the pump shaft 7, comprises a pocket hole 24 at its pump-side end. This pocket hole 24 is designed in a stepped manner and close to its base comprises a cylindrical section, which is envisaged for receiving a guide peg 25, which is arranged at the motor-side end of the pump shaft 9. This guide peg 25 in the installation position (FIG. 3) is seated with play within the base-side recess of the pocket hole 24. A section 26, which is widened with respect to this, connects to this in the pocket hole, which is provided with an inner thread, which is provided and envisaged for receiving an outer thread 27 of the pump shaft 9. Again, a cylindrical section 28 connects to the threaded section 26 in the pocket hole 24, in the direction of the pump, in a widened manner, and this cylindrical section is continued up to the pump-side end of the motor shaft 7.

On the shaft side, a conically widening section 29 which merges into a cylindrical section 30 which forms part of a first fit 31, connects on the shaft side to the section provided with an outer thread 27, seen in the direction of the impellers 10. A likewise cylindrical section 32 connects to this cylindrical part 30, but is formed set back with respect to the cylindrical part 30, thus has a smaller diameter. A further cylindrical section 33 which forms part of a second fit 34, connects to the cylindrical section 32. This cylindrical section 33 has a larger diameter than the cylindrical part 30 of the first fit. It is moreover provided with several peripheral grooves 35 which form lubrication grooves. From there, the shaft continues with an essentially equal cylindrical outer periphery up to a transition region 36, in which it merges into a splined shaft section 37 in a conically tapering manner. An abutment ring 38, which forms an axial abutment for the impellers 10, is seated in this transition region, and the impellers are held in a rotationally fixed manner on the splined shaft section 37 by way of the splined shaft profile, and are clamped at the end-side by way of a nut 39.

As is particularly evident from FIG. 3, in the installation position, the cylindrical part 30 of the pump shaft 9 which forms a transition fit with the cylindrical section 28 of the pocket hole 24, is seated centrally in the region of the motor shaft 7, which carries the ball bearing 11. The cylindrical section 33 on the other hand, which forms a press fit with the cylindrical section 28 of the pocket hole 24, is seated in the region of the pocket hole, which is arranged at a distance to the ball bearing 11. The connection of the shafts 7 and 9 is thus effected in two fits, specifically a transition fit 31 in the bearing region, and a press fit 34 close to the end of the motor shaft 7. By way of this, on the one hand an adequately firm non-positive fit connection is ensured, but on the other hand, it is ensured that the bearing seat is not compromised by the fit lying therebeneath, since here it is the case of a transition fit. However, where deformations may not be completely ruled out, also on the outer periphery of the shaft 9, specifically where the press fit 34 is seated, the motor shaft 7 with regard to design is not loaded, and at all events a possible, even if a minimal deformation there has no significance for the carrying function of the slinger ring 16. This design thus reduces the axial construction length in this region, but however reliably avoids problems which are to be expected in the context of fits in this region.

The region between the cylindrical section 33 and the transition region 36 serves for receiving the axial face seal 15.

The pump shaft 9, as is described above and represented in the drawing, may be fastened onto the finished assembled motor 1, without unallowably loading this. The joining forces for joining the transition fit 31 as well as the press fit 34, which are directed in the axis direction of the shafts 7, 9, are mustered by a torque which is exerted between the motor shaft 7 and the pump shaft 9. For this, suitable positive fit means are provided on these shafts 7, 9. The shafts 7 and 9 are firstly moved axially onto one another, until the guide peg 25 lies completely within the threaded section 26. Then the torque is introduced, which ensures that the outer thread 27 of the shaft 9 rotates into the threaded section 26 of the pocket hole 24 of the motor shaft 7. The shafts 7, 9 are moved axially onto one another in accordance with the thread pitch. Thereby, finally the cylindrical sections 30 and 33 are moved into the region of the fits 31 and 34. The largest forces thereby arise in the region of the press fit 34. The lubrication grooves 35 are provided in order to keep these forces within permissible limits. The operationally correct position is reached once the guide peg 25 abuts on the base of the pocket hole bore 24. Then, firstly the pump housing part connecting to the bearing carrier 5 is assembled, whereupon the axial face seal 15 and then the abutment ring 38 as well as the impellers are assembled. The further assembly of the pump is effected in the normal manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A multi-stage centrifugal pump assembly comprising:
    a motor housing (2) having a rotatably mounted motor shaft (7) which carries a rotor (6);
    a pump housing (4) having a rotatably mounted pump shaft (9), on which at least two impellers (10) are arranged in a rotationally fixed manner, wherein the pump housing (4) is fixedly connected to the motor housing (2), and the motor shaft (7) is fixedly connected to the pump shaft (9), and wherein a motor-side end of the pump shaft (9) is fixed within a pocket hole (24) at a pump-side end of the motor shaft (7); and a bearing (11) for mounting the motor shaft (7) and the pump shaft (9), the bearing being arranged in a bearing carrier (5) provided in a connection region of the motor housing and the pump housing, wherein the pump shaft (9) comprises an outer thread (27) on or near to the motor-side end of the pump shaft, the outer thread meshing into an inner thread (26) of the pocket hole (24), a first fit section (31) of the motor shaft (7) is spaced from the outer thread in a direction toward the impellers, and, a different second fit section (34) of the motor shaft (7) is spaced from the first fit section and spaced from the outer thread in a direction toward the impellers, the first fit section and the second fit section are within the pocket hole (24).

2. The centrifugal pump assembly according to claim 1, wherein the first fit section is a transition fit.

3. The centrifugal pump assembly according to claim 1, wherein the second fit section is a press fit.

4. The centrifugal pump assembly according to claim 1, further comprising a guide peg (25) provided at the motor-side end of the pump shaft (9) and seated with play in a correspondingly formed end of the pocket hole (24).

5. The centrifugal pump assembly according to claim 1, wherein the pump shaft (9) runs in a conically widening manner from the outer thread (27) to the first fit section.

6. The centrifugal pump assembly according to claim 1, wherein the pump shaft (9), in a region between the first fit section and the second fit section, has a smaller diameter than in the first fit section and the second fit section.

7. The centrifugal pump assembly according to claim 6, wherein the pump shaft (9) is provided with peripheral lubrication grooves (35) in a region of the second fit section.

8. The centrifugal pump assembly according to claim 1, wherein the first fit section (31) is arranged in a region of the motor shaft (7), which is surrounded by the bearing (11).

9. The centrifugal pump assembly according to claim 1, wherein the second fit section (34) is arranged in a region of the motor shaft (7) on a side of the bearing (11) towards the pump-side end.

10. The centrifugal pump assembly according to claim 1, further comprising ring (16) arranged on the pump shaft (9) directly in front of the pump-side end of the motor shaft (7) and encompassing the pump shaft (9) in a tight manner and arranged within a free space (19) of the bearing carrier (5), the free space being conductively connected to the surroundings via a channel (20) connected at the bottom.

11. The centrifugal pump assembly according to claim 10, wherein the slinger ring (16) has a roughly h-shaped cross section, and is held in a locking manner with a positive fit by a bead (17) formed at the pump-side end of the motor shaft (7).

12. The centrifugal pump assembly according to claim 10, wherein the slinger ring (16) is formed of plastic and is biased with respect to the pump shaft (9).

13. The centrifugal pump assembly according to claim 10, further comprising a stationary sealing ring (22) provided in the bearing carrier (5) between the bearing (11) and the slinger ring (16), and radially sealed with respect to the bearing carrier (5) by an O-ring (23), the stationary sealing ring runs sealingly in a biased manner on an axial side of an inner bearing ring for the bearing, which co-rotates with the shaft (7, 9).

14. The centrifugal pump assembly according to claim 13, wherein the stationary sealing ring (22) is arranged within a free space (21), which is conductively connected to the surroundings via the channel (20).

* * * * *